(12) United States Patent
Suganuma

(10) Patent No.: US 6,402,229 B1
(45) Date of Patent: Jun. 11, 2002

(54) STRUCTURE FOR FRONT PORTION OF VEHICLE

(75) Inventor: Yasushi Suganuma, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,349

(22) Filed: Sep. 29, 1999

(30) Foreign Application Priority Data

Oct. 2, 1998 (JP) .......................................... 10-281242

(51) Int. Cl.⁷ .......................... B62D 21/02; B62D 21/08; B62D 21/09; B62D 21/15; B60R 16/04

(52) U.S. Cl. .................. 296/203.02; 296/204; 296/194; 180/68.5; 180/311; 180/312; 280/781

(58) Field of Search ............................ 296/204, 203.02, 296/203.01, 194, 188; 180/68.5, 311, 312, 53.8; 280/781, 784, 783; 248/678, 676, 346.01

(56) References Cited

U.S. PATENT DOCUMENTS

| | | | | |
|---|---|---|---|---|
| 2,204,877 A | * | 6/1940 | Anderson | 248/647 |
| 2,294,855 A | * | 9/1942 | Thomason | 248/678 |
| 3,718,364 A | * | 2/1973 | Fischer et al. | 296/189 |
| 3,983,952 A | * | 10/1976 | McKee | 280/778 |
| 4,093,253 A | * | 6/1978 | Lehr | 280/789 |
| 4,191,356 A | * | 3/1980 | Ashmun et al. | 248/678 |
| 4,317,497 A | * | 3/1982 | Alt et al. | 180/68.5 |
| 4,365,681 A | * | 12/1982 | Singh | 180/68.5 |
| 4,506,908 A | * | 3/1985 | Harle | 296/204 |
| 4,534,589 A | * | 8/1985 | Booher | 296/204 |
| 4,572,474 A | * | 2/1986 | Derlich | 248/678 |
| 4,573,724 A | * | 3/1986 | Campen | 293/136 |
| 4,624,493 A | * | 11/1986 | Hillebrand et al. | 293/136 |
| 4,660,799 A | * | 4/1987 | Butland | 248/676 |
| 4,767,153 A | * | 8/1988 | Kawasaki et al. | 296/194 |
| 4,779,692 A | * | 10/1988 | Hagarty et al. | 180/68.5 |
| 4,790,588 A | * | 12/1988 | Corson | 296/204 |
| 4,840,423 A | * | 6/1989 | Maekawa | 296/194 |
| 4,846,295 A | * | 7/1989 | Shepard et al. | 180/68.5 |
| 5,085,396 A | * | 2/1992 | Mansson | 248/676 |
| 5,195,780 A | * | 3/1993 | Inoue et al. | 296/204 |
| 5,417,453 A | * | 5/1995 | VanDenberg | 296/204 |
| 5,425,561 A | * | 6/1995 | Morgan | 293/120 |
| 5,451,028 A | * | 9/1995 | Lietti | 248/676 |
| 5,464,188 A | * | 11/1995 | Priebe et al. | 248/678 |
| 5,497,816 A | * | 3/1996 | Darland | 248/676 |
| 5,501,504 A | * | 3/1996 | Kunz | 296/204 |
| 5,522,734 A | * | 6/1996 | Goertzen | 180/68.5 |
| 5,687,669 A | * | 11/1997 | Engler | 296/213 |

(List continued on next page.)

FOREIGN PATENT DOCUMENTS

| | | | | |
|---|---|---|---|---|
| AU | 0015791 | * | 12/1971 | 248/678 |
| CA | 449851 | * | 7/1948 | 248/678 |
| GB | 491788 | * | 9/1938 | 180/68.5 |
| IT | 613058 | * | 11/1960 | 280/781 |

*Primary Examiner*—Joseph D. Pape
*Assistant Examiner*—Hilary Gutman
(74) *Attorney, Agent, or Firm*—Carrier, Blackman & Associates, P.C.; Joseph P. Carrier; William D. Blackman

(57) ABSTRACT

A structure for a front portion of a vehicle having a ladder type frame installed on left and right side frames arranged longitudinally of a vehicle at a position a predetermined distance rearward from front tips of impact absorption beams at front ends of the side frames and forward of a dash panel in such a manner as to extend between the left and right side frames. The ladder type frame is disposed rearward of the impact absorption beams and forwardly of the dash panel so that auxiliary machines of the vehicle, such as a battery an air conditioning compressor, and the like, are mounted thereon. A crushable zone is provided in front of front side frames. In the above construction, the length of the zone for accommodating the auxiliary machines of the vehicle is markedly shorter than that provided by the prior art, and therefore it is possible to sufficiently reduce the length of the nose of the vehicle.

20 Claims, 7 Drawing Sheets

U.S. PATENT DOCUMENTS

| | | | | |
|---|---|---|---|---|
| 5,704,644 A | * | 1/1998 | Jaggi | 296/204 |
| 5,918,692 A | * | 7/1999 | Sekita et al. | 180/56 |
| 5,921,578 A | * | 7/1999 | Sekita et al. | 280/788 |
| 6,085,854 A | * | 7/2000 | Nishikawa | 180/68.5 |
| 6,099,039 A | * | 8/2000 | Hine | 296/204 |
| 6,099,267 A | * | 8/2000 | Ames et al. | 248/676 |

* cited by examiner

PRIOR ART

STRUCTURE FOR FRONT PORTION OF VEHICLE

BACKGROUND OF THE INVENTION

1. Field of the Invention

The present invention relates to a structure for a front portion of a vehicle suitable for a small vehicle.

2. Description of the Related Art

FIG. 7 is a plan view of a conventional front portion of a vehicle. In a vehicle such as an electric car or a midship engine or rear-engine car in which an internal combustion engine is installed at a midship or rear portion thereof, auxiliary machines are often installed in a front portion of the vehicle 100. The auxiliary machines include an air conditioner compressor 101, an air conditioner inverter 102, a battery 103, an ABS (anti-locking brake system) unit 104 or the like.

In a known structure, as shown in the figure, the aforesaid auxiliary machines of the vehicle are mounted at front portions of the left and right side frames 106, 107.

In addition, reference numeral 110 denotes a bumper beam, 111, 111, front wheels and 112, a steering wheel.

In FIG. 7, reference numeral 113, 113 denotes an impact absorption beam. These impact absorption beams 113, 113 are provided at the front portions of the side frames 106, 107. In other words, the impact absorption beams 113, 113 are connected to the bumper beam 110 at front ends thereof so that the impact absorption beams 113, 113 can absorb a great external force applied to the bumper beam 110. In the figure, N1 denotes the length of a nose of the vehicle.

Recently, there is a tendency to increase the performances and capacities of the aforesaid auxiliary machines of the vehicle in order to improve the comfort inside the passenger compartment and handling properties of the vehicle. As the capacities of the auxiliary machines are increased, the sizes thereof also get larger, resulting in the increase in length N1 of the nose.

On the other hand, in a small vehicle, since the overall length thereof is limited, if the nose length N1 is increased, the length of the passenger compartment has to be reduced or a luggage compartment at the rear of the vehicle has to be made smaller, this leaving a problem in designing a vehicle.

SUMMARY OF THE INVENTION

An object of the present invention is to provide a structure for a front portion of a vehicle which can reduce further the nose length thereof.

According to the invention a front portion has a ladder type frame installed on left and right side frames arranged longitudinally of a vehicle at a position a predetermined distance rearward from front tips of said side frames and forward of a dash panel in such a manner as to extend between said left and right side frames, and auxiliary machines of said vehicle are supported on the ladder type frame.

The above and other objects, features, and advantages of the present invention will be more apparent from the following detailed description taken in conjunction with the accompanying drawings.

DETAILED DESCRIPTION OF THE PREFERRED EMBODIMENT

Figure 1:
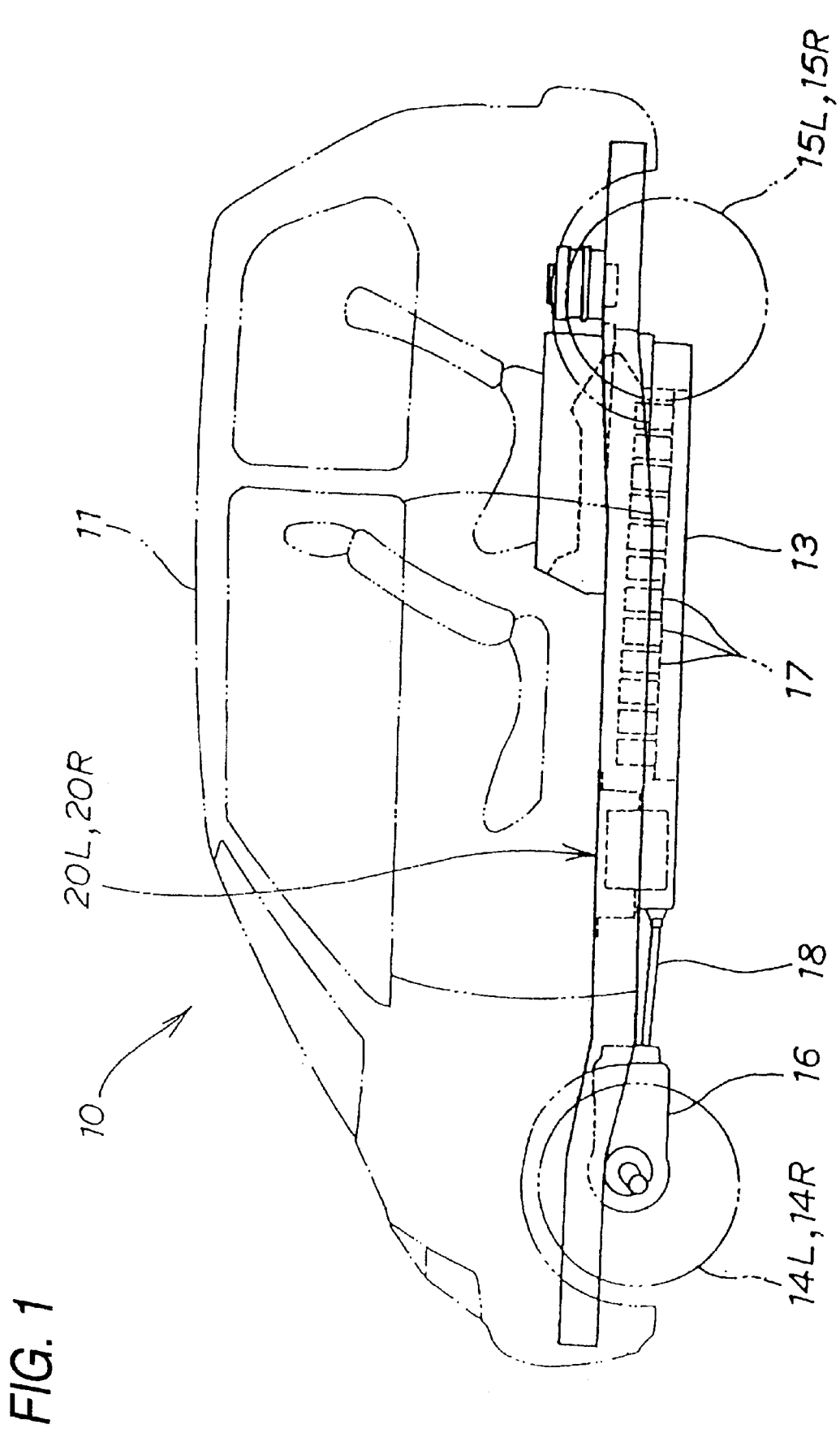
FIG. 1 is a side view of a vehicle according to the present invention.

The present invention provides a structure for a front portion of a vehicle, wherein an auxiliary ladder type frame is installed on left and right side frames arranged longitudinally of the vehicle at a position a predetermined distance rearward from front tips of the side frames and forward of a dash panel in such a manner as to extend between the left and right side frames, and auxiliary machines of the vehicle are supported on the ladder type frame. The ladder type frame constitutes an auxiliary frame means of the vehicle.

The ladder type frame is installed on the left and right side frames in such a manner as to extend therebetween, and auxiliary machines such as an air conditioner compressor and the like are then installed thereon. Effectively, the ladder type frame functions as an auxiliary frame means for supporting the auxiliary machines. In a general ladder, a plurality of steps are provided at predetermined intervals along two left and right main beams in such a manner as to extend therebetween. In a ladder type frame adopting the construction of such a ladder, a plurality of sub-beams are laid between two main beams in such a manner as to extend therebetween, and auxiliary machines of a vehicle are mounted on these sub-beams. These two main beams then function as cross members provided on the side frames in such a manner as to extend therebetween and contribute to the improvement in rigidity of the chassis frame. The plurality of sub-beams function to improve the torsional rigidity of the ladder type frame itself, and therefore the ladder type frame is capable of becoming an effective reinforcement member for the chassis frame.

Referring to the accompanying drawings, a mode of operation of the present invention will be described below. Characters, L and R, suffixed to reference numerals denote, respectively, "left" and "right" when viewed from a driver.

FIG. 1 is a side view of a vehicle to which the present invention is applied. The vehicle 10 is an electric car which has side frames 20L, 20R (20R denoting the side frame disposed on the back side of the drawing) arranged in a lower part of a vehicle body in such a manner as to extend in a fore and aft (longitudinal) direction, a battery box 13 disposed between the side frames 20L, 20R, front wheels 14L, 14R and rear wheels 15L, 15R disposed, respectively, at front and rear parts of the vehicle body 11, a driving electric motor 16 disposed in the vicinity of the front wheels 14L, 14R, and batteries 17 . . . (hereinafter, . . . denoting plurality) stored in the battery box 13, whereby electric energy of the batteries so stored is sent to the driving electric motor 16 via a wiring harness 18.

Figure 2:
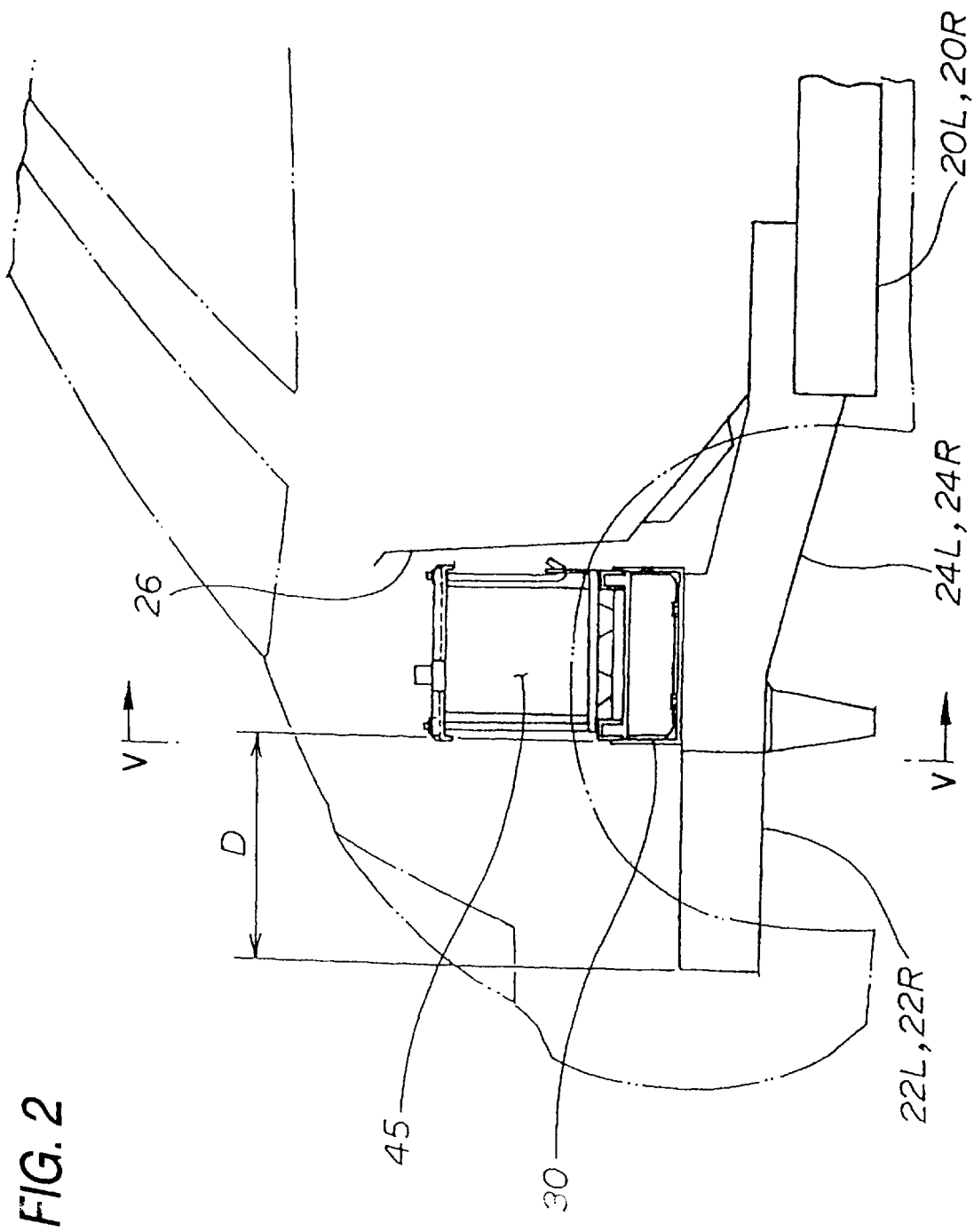
FIG. 2 is an enlarged view of a front portion of the vehicle according to the present invention.

FIG. 2 is an enlarged view of the front portion of the vehicle to which the present invention is applied. Although this is not described in the description referring to FIG. 1, the side frames 20L, 20R include impact absorption beams 22L, 22R and front side frames 24L, 24R, respectively, in that order from the front. In the present invention, a ladder type frame 30 is installed on these front side frames 24L, 24R in a state in which they extend in a front-and-back direction of the drawing.

To be specific, in the present invention, the ladder type frame 30 for receiving thereon auxiliary machines of the vehicle 10 is installed on the left and right side frames 20L, 20R arranged in the longitudinal direction of the vehicle 10 at a position a predetermined distance (in this example, a distance D conforming to the length of the impact absorption beams 22L, 22R) rearward from front tips of the left and right side frames 20L, 20R (in other words, front tips of the impact absorption beams 22L, 22R) and forward of a dash panel in such a manner as to extend between the left and right side frames 20L, 20R.

Figure 3:
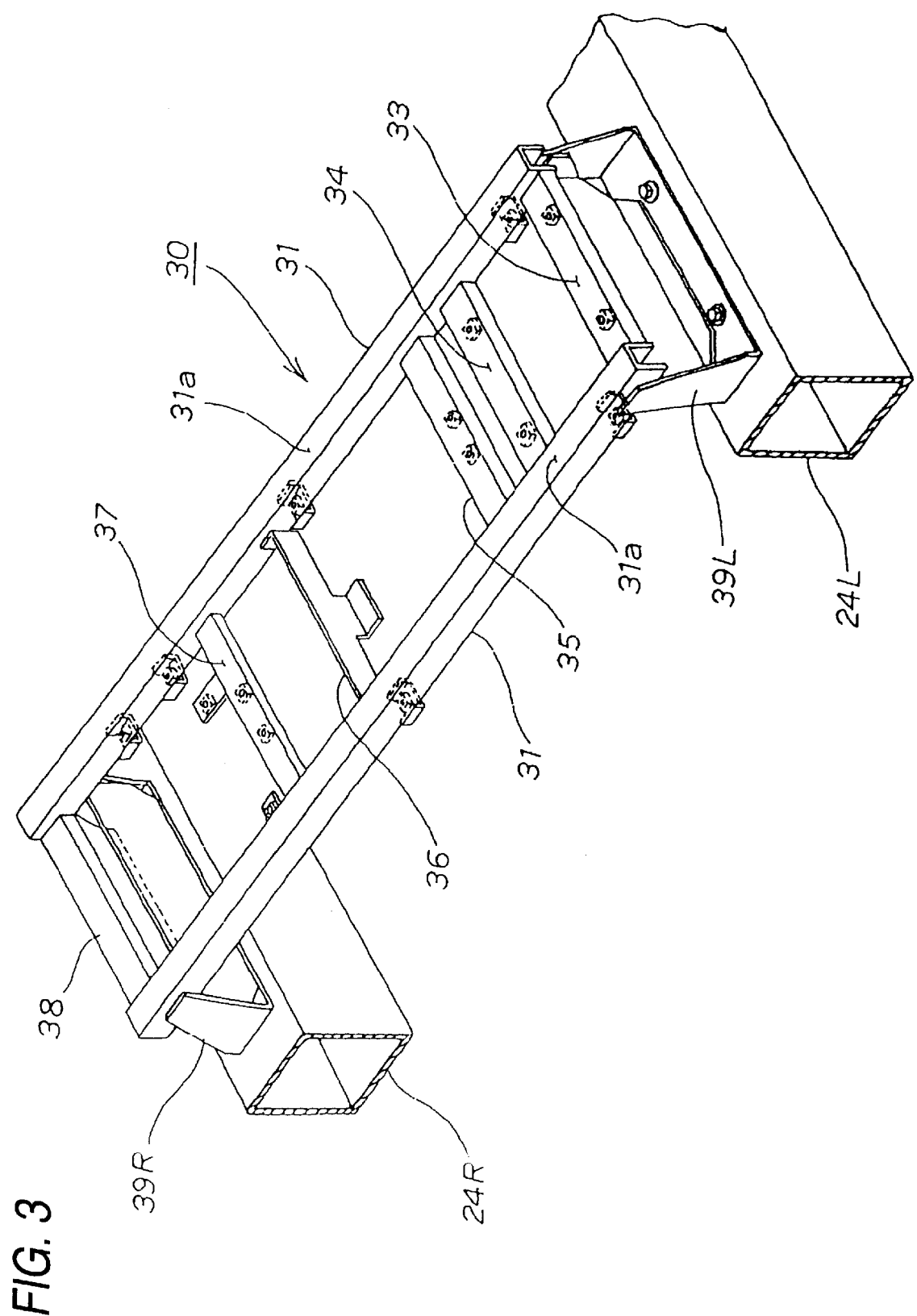
FIG. 3 is a perspective view of a ladder type frame according to the present invention.

FIG. 3 is a perspective view of the ladder type frame according to the present invention. The ladder type frame 30 includes two main beams 31, 31, a plurality of sub-beams 33 to 38 that are provided in such a manner as to extend between those main beams 31, 31 and leg portions 39L, 39R for attaching the main beams 31, 31 to the front side frames 24L, 24R. The main beam 31 is a channel rail and in this case it is arranged such that a web 31a is oriented upwardly. The web 31a is suitable for receiving things thereon, because it has a flat surface. In addition, the leg portions 39L, 39R are each constructed by press bending a metal sheet, and the configuration and dimensions thereof are free to be determined.

The sub-beams 33 to 38 are disposed suitably depending on auxiliary machines to be received thereon. The sub-beams 33 to 38 function as cross members for the main beams 31, 31 such as steps of a ladder. Therefore, they provide a reinforcement function to improve the torsional rigidity.

Thus, the highly rigid ladder type frame is installed on the front side frames 24L, 24R in such a manner as to extend therebetween so that the ladder type frame function as a cross member for those side frames. Therefore, the torsional rigidity of the chassis frame can be improved with this ladder type frame 30.

Figure 4:
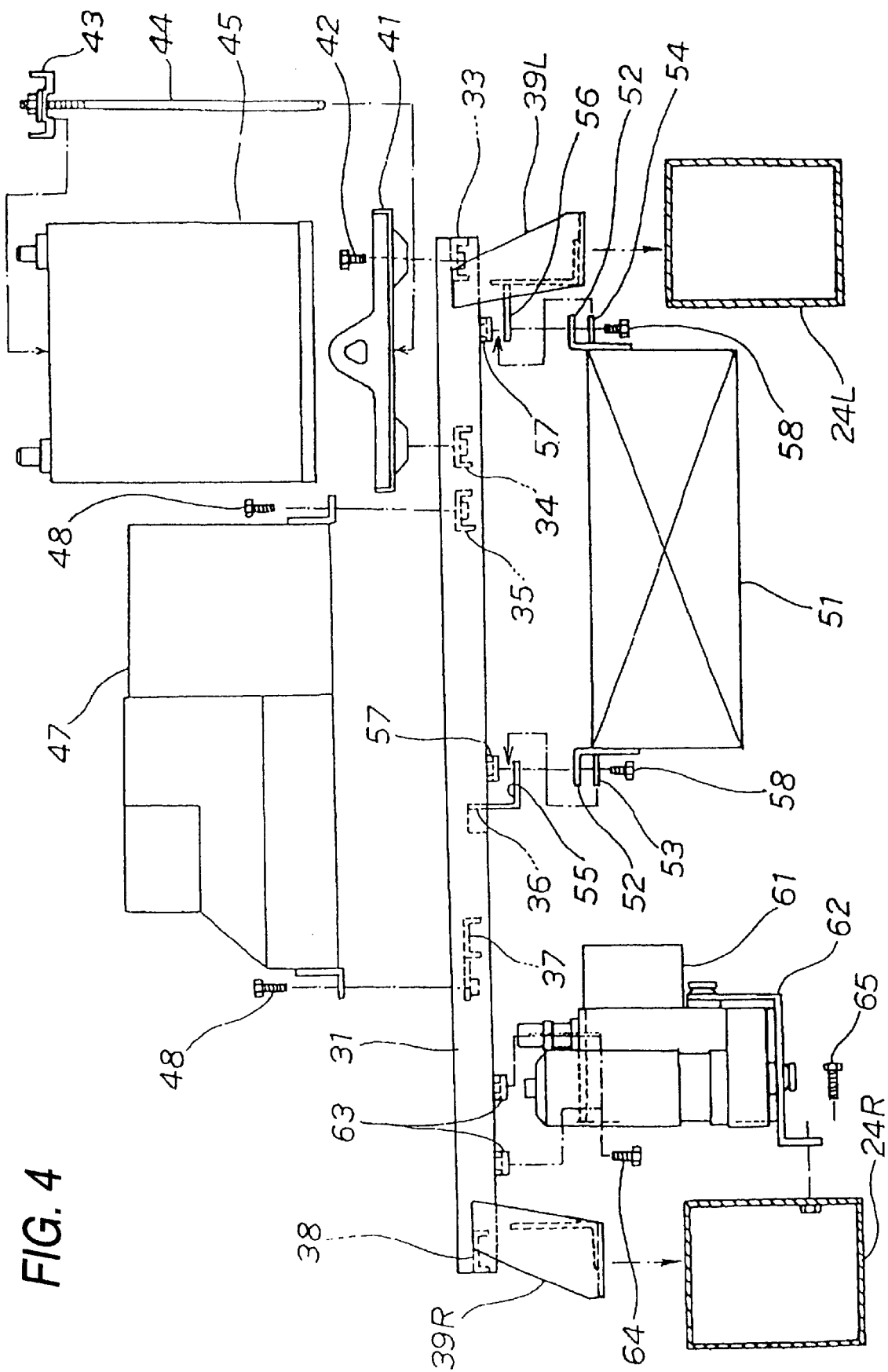
FIG. 4 is an exploded front view showing how auxiliary machines are mounted on the ladder type frame according to the present invention.

FIG. 4 shows how to attach auxiliary machines of a vehicle to the ladder type frame according to the present invention. Because FIG. 4 is a front view seen from the front of a vehicle, a reference character L is shown on the right-hand side of the drawing, while a reference character R on the left-hand side of the drawing. In addition, auxiliary machines that will be described below are normally installed on the ladder type frame 30 via an insulator, however, for the sake of clarity, such insulators are omitted from the drawings and description.

A battery tray 41 is placed on the sub-beams 33, 34 shown on the right-hand side of the drawing and is then fixed thereto with machine screws 42 . . . . A battery 45 is placed on this battery tray 41 and is fixed thereto with a bridge plate 43 and anchor bolts 44, 44 (the anchor bolt on the back side being not shown). This battery 45 is termed an interior battery for use for supplying power to lamps.

An air conditioner compressor 47 is placed on the next sub-beams 35, 37 and is fixed thereto with machine screws 48 . . . .

Furthermore, an air conditioner inverter 51 is attached to the frame from below. This air conditioner inverter 51 has flanges 52 for screwing with machine screws 58 . . . (in total four flanges being disposed in the corners thereof) and mount pieces 53, 54. One of the mount pieces, the mount piece 53, is placed on a supporting seat 55 extending from the sub-beam 36 and the other mount piece 54 is placed on a supporting seat 56 extending from the leg portion 39L. Then, the machine screwing flanges 52 . . . are brought into abutment with nuts 57 . . . affixed to bottom surfaces of the main beams 31 for fixation thereto with the machine screws 58 . . . .

In this construction, even if the machine screws 58 loosen, the supporting seats 55, 56 function to support the air conditioner inverter 51. Therefore, there is no risk of the inverter 51 being let fall. In addition, in mounting the heavy inverter 51, it can temporarily be supported on the supporting seats 55, 56 while tightening the machine screws 58 . . . . Thus, there is needed no labor force to support the inverter 51, thereby making it possible to reduce the work load of a worker or workers involved.

Furthermore, an ABS unit 61 is mounted on the ladder type frame by attaching a bracket 62 to the ABS unit 61, fixing an upper portion of the bracket 62 to nuts 63 . . . provided on the bottom surface of the main beam 31 with machine screws 64, and fixing a lower portion of the bracket 62 to the front side frame 24R with a machine screw 65.

A state is shown in the next drawing in which the aforesaid attachments of the auxiliary machines are completed.

Figure 5:
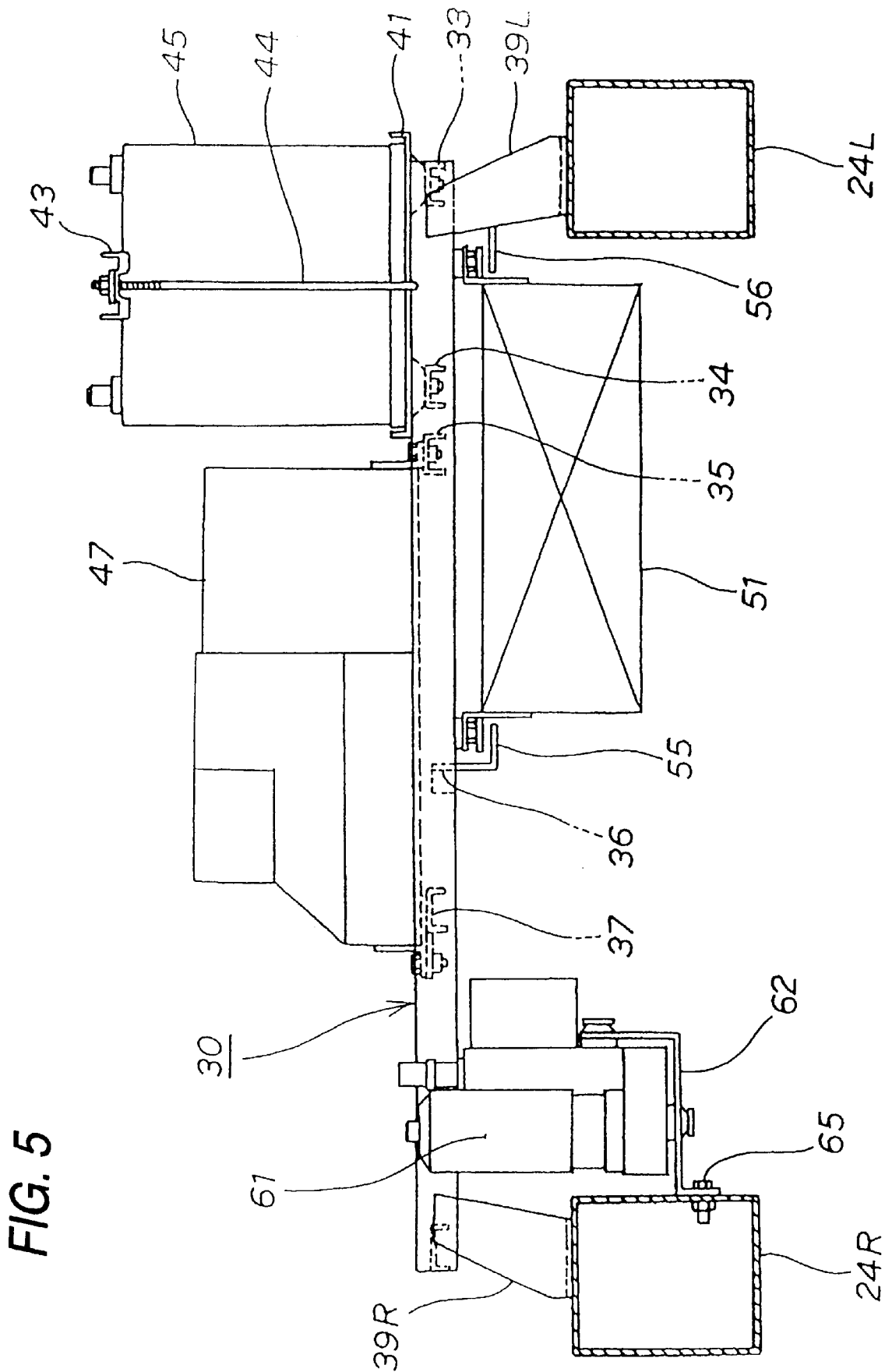
FIG. 5 is a cross-sectional view taken along the line V—V of FIG. 2.

FIG. 5 is a cross-sectional view taken along the line 5—5 of FIG. 2 and shows the ladder type frame 30 as installed on the two front side frames 24L, 24R in such a manner as to extend therebetween and the auxiliary machines of the vehicle such as the battery 45, the air conditioner compressor 47, the air conditioner inverter 51 and the ABS unit 61 as mounted on the ladder type frame so installed. In addition, shown as a small gap above the supporting seats 55, 56 in the drawing are gaps into which insulators, not shown, are filled.

As is clear from the drawing, the battery 45, the air conditioner compressor 47, the air conditioner inverter 51 and the ABS unit 61 can be mounted on the ladder type frame 30 in advance as a sub-assembly. Then, the ladder type frame 30 so assembled with the auxiliary machines can be mounted on the front side frames 24L, 24R. This can reduce the working time involved on a main vehicle assembly line, which is considered as realizable due to the high rigidity of the ladder type frame 30.

Described next will be a function of a structure for a front portion of a vehicle constructed based on the above described ladder type frame.

Figure 6A:
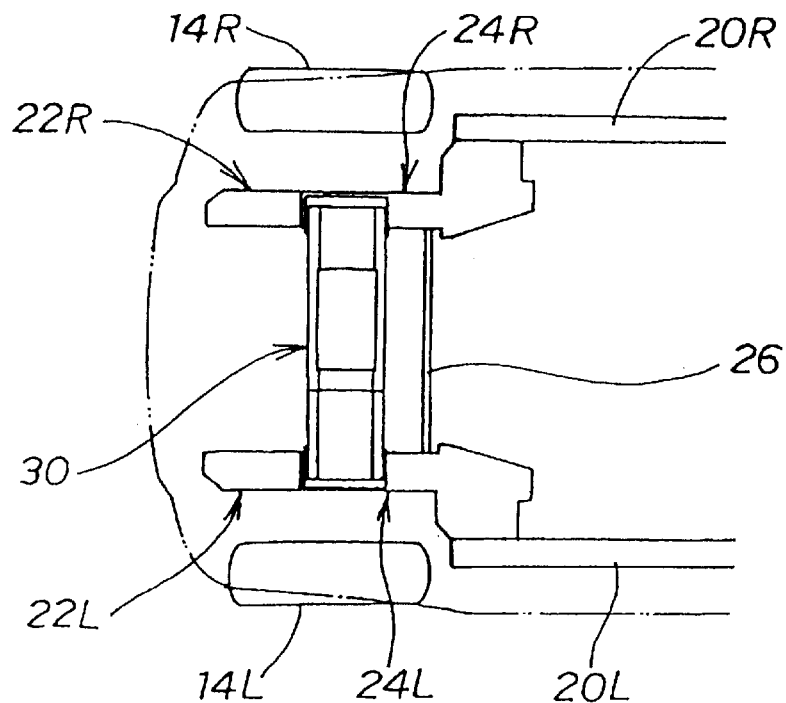
FIG. 6A to 6C are an explanatory view explaining a structure for a front portion of a vehicle according to the present invention.
Figure 6B:
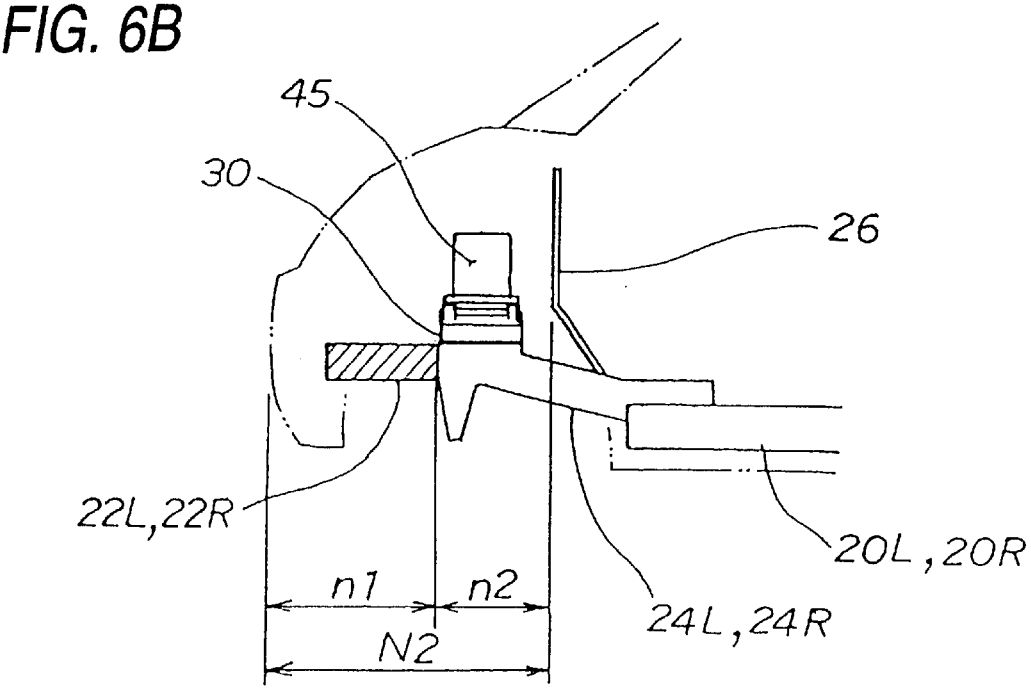
Figure 6C:
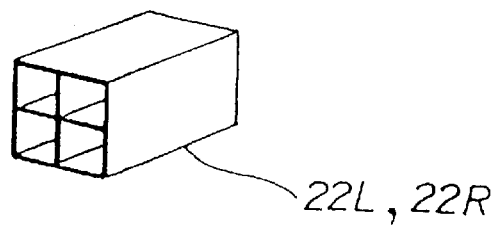

FIGS. 6A to 6C are explanatory views explaining a function of the structure for a front portion of a vehicle according to the present invention.

Fig.6A is a plan view of a front portion of a vehicle, showing a state in which the ladder type frame 30 is provided between the left and right front side frames 24L, 24R in such a manner as to extend therebetween. Reference numerals 14L, 14R denote the front wheels and reference numeral 26 denotes the dash panel.

FIG. 6B is a side view of the front portion of the vehicle, and a member shown as shaded is one of the impact absorption beams 22L, 22R. The side view shows a state in which the ladder type frame 30 is disposed at a position rearward of these impact absorption beams 22L, 22R and forward of the dash panel 26 so that the auxiliary machines of the vehicle such as the battery 45 and the like are mounted thereon.

FIG. 6C is a perspective view showing the structure of the impact absorption beam. The impact absorption beams 22L, 22R are each an elongated member having a cross-section looking like a "framed cross" when viewed from the front. Large longitudinal and transverse dimensions of the external surface of the impact absorption beams 22L, 22R provide a sufficiently large bending-torsion rigidity, and therefore they can properly support a bumper beam (not shown).

The impact absorption beams 22L, 22R are formed of a sheet metal. If an axial force is applied to the impact absorption beams 22L, 22R, they can be positively buckled and deformed in an axial direction. Impact energy can be absorbed by a deformation so produced.

Figure 7:
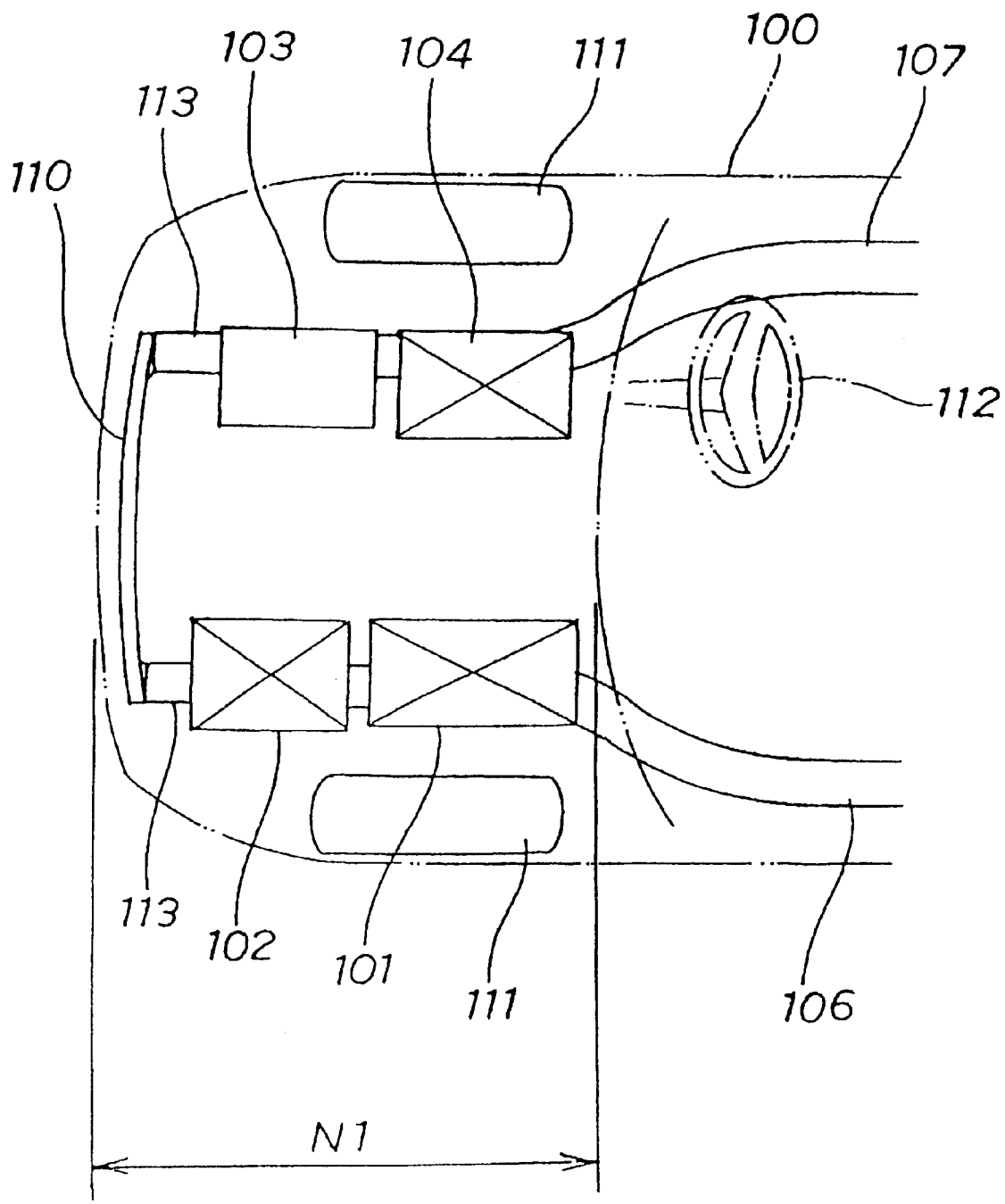
FIG. 7 is a plan view of a structure for a front portion of a vehicle according to the conventional art.

Now, returning to FIG. 6B, a portion forwardly of the front side frames 24L, 24R forms and functions as a crushable zone. Assuming that the length of this crushable zone is n1, and the length of the zone for accommodating the auxiliary machines of the vehicle is n2, an addition of these two lengths, (n1+n2), equals to the length N2 of the nose of the vehicle. The length n2 of the auxiliary machines accommodating zone is markedly shorter than that provided by the conventional art (refer to FIG. 7). Therefore, the length N2 of the nose can be sufficiently shortened.

The structure for a front portion of a vehicle according to the present invention is preferably suitable for au electric car, but the structure is not limited to the application for such an electric car. The application of the present invention to passenger cars in general will produce no problem or inconvenience.

In addition, the term "auxiliary machine or machines" is used herein as a general term for auxiliary machines that are mounted on a vehicle. Therefore there is no intention to limit the type and/or number thereof.

Moreover, the ladder type frame according to the present invention is a frame that is built into a ladder-like configuration from two main beams and a plurality of sub-beams and which can provide a high rigidity for its weight which is relatively light. Furthermore, in the ladder type frame, the sub-beams can be made use of as a support members for auxiliary machines, and this also differentiates the ladder type frame of the present invention from a single cross beam and/or a simple bracket. It is needless to say that the present invention encompasses ladder type frames other than the present embodiment described above and shown in the drawings, including a ladder type frame resulting from a combination of three or more main beams, which results from addition of main beams to the existing two main beams, and a plurality of sub-beams, as well as a ladder type frame, resulting from a combination of the two main beams and the plurality of subbeams and a brace (a diagonal member).

The present invention constructed as described above provides the following effectiveness.

According to the present invention, the ladder type frame is provided such that it extends between the left and right side frames so that the auxiliary machines of the vehicle including the air conditioner compressor can be mounted thereon. In other words, a plurality of auxiliary machines of the vehicle are arranged in a widthwise direction of the vehicle and this permits the marked reduction in longitudinal length of the zone for accommodating auxiliary machines of the vehicle, thereby making it possible to reduce the length of the nose of the vehicle.

The ladder type frame used for such a purpose is inevitably constituted by a frame having two main beams and a plurality of sub-beams provided such that they extend between the main beams. Therefore, the ladder type frame so constructed is light-in weight, provides a high rigidity for its lightweight and contributes to the improvement in rigidity of the chassis frame.

Consequently, by adopting the ladder type frame according to the present invention, it is possible not only to reduce the length of the nose of the vehicle, but also to improve the rigidity of the chassis frame thereof.

Although there has been described above what is the present embodiment of the invention, it will be understood to those in the art that variations and modifications may be made thereto without departing from the spirit or scope of the invention, as set forth in the appended claims.

What is claimed is:

1. A structure for a front portion of a vehicle having a front dash panel, comprising:

left and right side frames arranged longitudinally of said vehicle;

a ladder type frame installed on said left and right side frames forward of said dash panel in such a manner as to extend between said left and right side frames; and at least one of a battery and an auxiliary machine of said vehicle supported by said ladder type frame;

said ladder type frame including a pair of main beams extending transversely of the vehicle and a plurality of sub-beams connected between said main beams in a substantially planar, ladder shape; and said ladder type frame is disposed at a level above said side frames.

2. A structure for a front portion of a vehicle according to claim 1, further comprising:

an impact absorption beam in front of said left and right side frames;

wherein said ladder type frame is installed on said left and right side frames at a position a predetermined distance conforming to a length of said impact absorption beam rearward from front tips of said impact absorption beam.

3. A structure for a front portion of a vehicle according to claim 2, wherein said impact absorption beam extends longitudinally of the vehicle.

4. A structure for a front portion of a vehicle according to claim 2, wherein said impact absorption beam has a cross section shaped as a framed cross.

5. A structure for a front portion of a vehicle according to claim 2, wherein said impact absorption beam includes a pair of beam members extending forwardly from said left and right side frames.

6. A structure for a front portion of a vehicle according to claims 5, wherein said pair of beam members of said impact absorption beam extend longitudinally of the vehicle.

7. A structure for a front portion of a vehicle according to claim 1, wherein said ladder type frame further comprises leg portions for attaching said main beams to said side frames at said level above said side frames.

8. A structure for a front portion of a vehicle according to claim 7, wherein said at least one of said battery and said auxiliary machine of the vehicle is supported by said sub-beams of the ladder type frame.

9. A structure for a front portion of a vehicle according to claims 8, wherein said auxiliary machine is one of an air conditioning compressor, an air conditioning inverter and an ABS unit.

10. A structure for a front portion of a vehicle comprising:

left and right side frames extending in a longitudinal direction of the vehicle; and auxiliary frame means extending in a transverse direction of the vehicle and connected between front portions of the left and right side frames forward of a dash panel of the vehicle, for supporting a plurality auxiliary machines of the vehicle;

said auxiliary frame means comprising a ladder type frame including a pair of main beams extending transversely of the vehicle and a plurality of sub-beams connected between said main beams in a substantially planar, ladder shape.

11. A structure for a front portion of a vehicle according to claim 10, wherein said ladder type frame further comprises leg portions for attaching said main beams to said side frames at a level above said side frames.

12. A structure for front portion of a vehicle according to claim 10, wherein said plurality of auxiliary machines is supported by said sub-beams of said ladder type frame.

13. A structure for a front portion of a vehicle according to claim 12, wherein said auxiliary machines are mounted to said ladder type frame.

14. A structure for a front portion of a vehicle according to claim 12, wherein said auxiliary machines are an air conditioning compressor, an air conditioning inverter and an ABS unit.

15. A structure for a front portion of a vehicle according to claim 10, further comprising an impact absorption beam in front of said left and right side frames, and said auxiliary frame means is connected to said left and right side frames at a position a predetermined distance conforming to a length of said impact absorption beam rearward from front tips of the impact absorption beam.

16. A structure for a front portion of a vehicle according to claim 15, wherein said impact absorption beam includes a pair of beam members extending forwardly from said left and right side frames.

17. A structure for a front portion of a vehicle, comprising:

left and right side frames arranged longitudinally of said vehicle;

a ladder type frame installed on said left and right side frames forward of a dash panel in such a manner as to extend between said left and right side frames; and a plurality of auxiliary machines of the vehicle supported by said ladder type frame;

said ladder type frame including a pair of main beams extending transversely of the vehicle and a plurality of sub-beams connected between said main beams in a substantially planar, ladder shape.

18. A structure for a front portion of a vehicle according to claim 17, wherein said auxiliary machines are an air conditioning compressor, an air conditioning inverter, and an ABS unit.

19. A structure for a front portion of a vehicle according to claim 17, wherein said auxiliary machines are mounted to said ladder type frame.

20. A structure for a front portion of a vehicle according to claim 17, wherein said ladder type frame further comprises leg portions for attaching said main beams to said side frames at a level above said side frames.

* * * * *

UNITED STATES PATENT AND TRADEMARK OFFICE
CERTIFICATE OF CORRECTION

PATENT NO.    : 6,402,229 B1
DATED         : June 11, 2002
INVENTOR(S)   : Yasushi Suganuma It is certified that error appears in the above-identified patent and that said Letters Patent is hereby corrected as shown below:

Title page,
Item [57], ABSTRACT,
Line 10, after "battery" insert a comma.

Column 1,
Line 50, after "invention" insert a comma.

Column 2,
Line 4, after "according" insert -- to --.

Column 3,
Line 11, after "distance" insert -- D --.
Line 12, delete "D".
Line 34, after "31,31" insert a comma.
Line 39, change "function" to -- functions --.

Column 4,
Line 47, change "above" to -- above- --.

Column 5,
Line 23, change "au" to -- an --.
Line 38, change "a support members" to -- support members --.
Line 45, after the comma insert -- a frame --.
Line 48, delete the comma.
Line 67, change "light-in" to -- light in --.

Column 6,
Line 1, change "lightweight" to -- light weight --.
Line 49, change "claims" to -- claim --.
Line 60, change "claims" to -- claim --.

UNITED STATES PATENT AND TRADEMARK OFFICE
CERTIFICATE OF CORRECTION

PATENT NO. : 6,402,229 B1
DATED : June 11, 2002
INVENTOR(S) : Yasushi Suganuma

It is certified that error appears in the above-identified patent and that said Letters Patent is hereby corrected as shown below:

Column 7,
Line 2, after "plurality" insert -- of --.
Line 13, before "front" insert -- a --.

Signed and Sealed this

Fourteenth Day of January, 2003

JAMES E. ROGAN
*Director of the United States Patent and Trademark Office*